United States Patent [19]

Scamehorn et al.

[11] 4,107,421
[45] Aug. 15, 1978

[54] REMOVAL OF VINYL HALIDE FROM POLYVINYL HALIDE

[75] Inventors: John F. Scamehorn; David V. Porchey, both of Ponca City, Okla.

[73] Assignee: Continental Oil Company, Ponca City, Okla.

[21] Appl. No.: 714,058

[22] Filed: Aug. 13, 1976

[51] Int. Cl.² ............................ C08F 6/24; C08F 6/00
[52] U.S. Cl. .................................. 528/483; 526/344; 528/480
[58] Field of Search ............... 526/344, 345; 528/480, 528/483, 490, 499

[56] References Cited

U.S. PATENT DOCUMENTS

| 3,522,227 | 7/1970 | Thomas | 526/344 X |
| 3,622,553 | 11/1971 | Cines | 526/344 X |

FOREIGN PATENT DOCUMENTS 2,162,860  7/1972  Fed. Rep. of Germany ........... 526/344

Primary Examiner—Christopher A. Henderson
Attorney, Agent, or Firm—Bayless E. Rutherford, Jr.

[57] ABSTRACT

A method for reducing the vinyl halide content of polyvinyl halide, in particle form, containing vinyl halide, to a preselected level is disclosed. Briefly, the method comprises: (a) determining the threshold temperature corresponding to said preselected level of vinyl halide, and (b) purging the polyvinyl halide containing vinyl halide with an inert gas heated to a temperature of at least the determined threshold temperature until the vinyl halide content of the polyvinyl halide reaches said preselected level.

6 Claims, 1 Drawing Figure

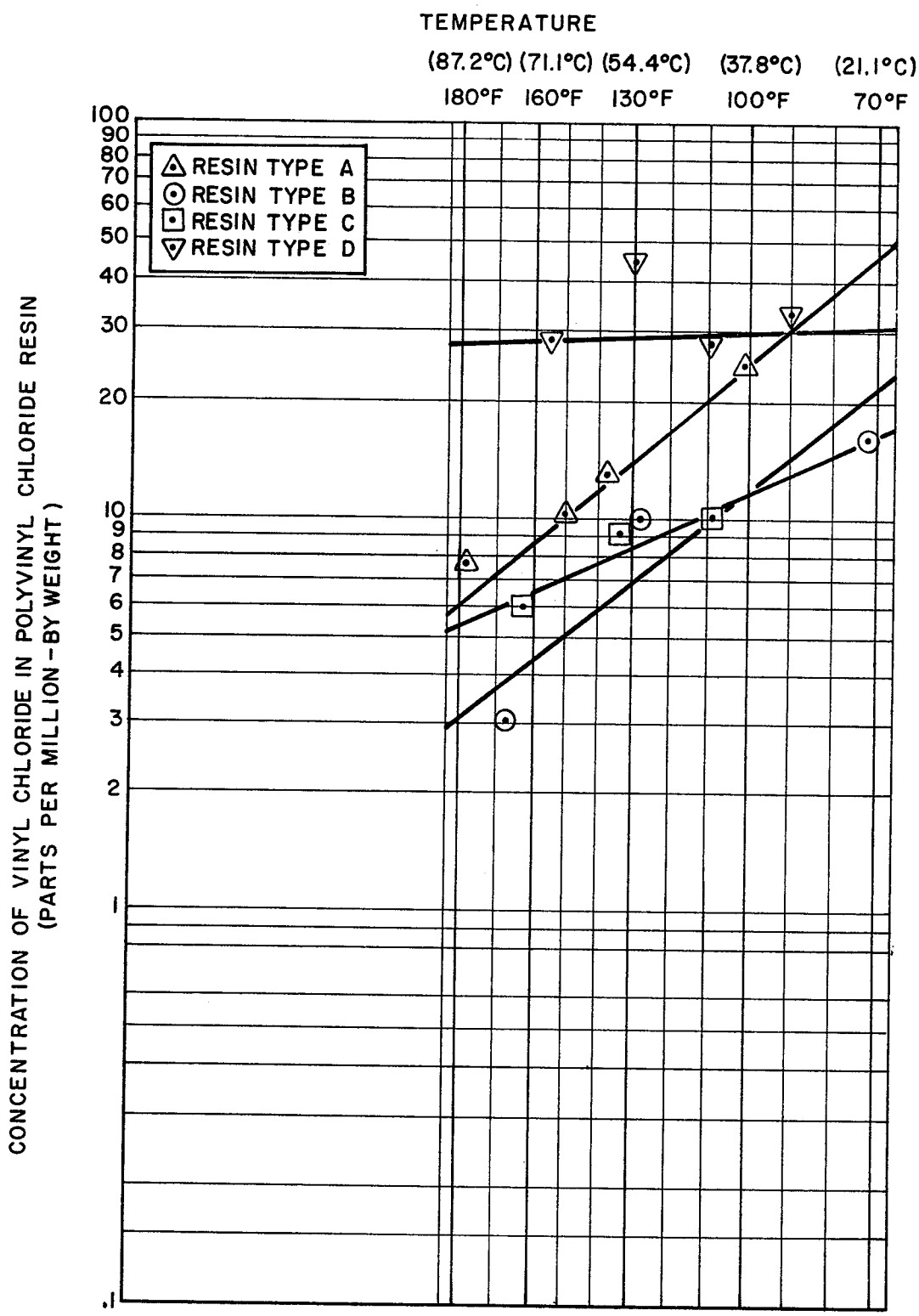

REMOVAL OF VINYL HALIDE FROM POLYVINYL HALIDE

FIELD OF THE INVENTION

The invention is in the general field of reducing the amount of a vinyl halide, e.g., vinyl chloride, from a polyvinyl halide.

BACKGROUND

Polyvinyl chloride, which is prepared by the polymerization of vinyl chloride, is one of the most useful of modern commercial plastics. Unfortunately, it is now believed that vinyl chloride in sufficient concentration is harmful. Accordingly, much research has been done recently on reducing the amount of vinyl chloride in polyvinyl chloride and in the environment in plants manufacturing polyvinyl chloride.

Our invention is directed to an improvement in the method of removing vinyl chloride from polyvinyl chloride.

PRIOR ART

A computer search did not produce any reference which teaches the process of the subject invention.

According to several basic sources on preparation of polyvinyl chloride, it is known to dry polyvinyl chloride by the use of heated air.

BRIEF SUMMARY OF THE INVENTION

Briefly stated, the present invention is directed to a method of reducing the vinyl halide content of polyvinyl halide, in particle form, containing vinyl halide, to a preselected level wherein the method comprises: (a) determining the threshold temperature corresponding to said preselected level of vinyl halide, and (b) purging the polyvinyl halide containing vinyl halide with an inert gas heated to a temperature of at least the determined threshold temperature until the vinyl halide content of the polyvinyl halide reaches said preselected level.

More specifically, the present invention is directed to a method of reducing the vinyl halide content of polyvinyl halide in, particle form, containing vinyl halide, to a preselected level said method comprising:

(a) determining the threshold temperature corresponding to said preselected level of vinyl halide by the steps of:
  (1) placing a first portion of said polyvinyl halide resin containing vinyl halide in a reservoir through which an inert gas can be passed,
  (2) passing an inert gas heated to a first temperature through the reservoir until the concentration of vinyl halide in the effluent gas is less than 0.5 part per million by volume,
  (3) determining the residual vinyl halide content of said polyvinyl halide resin,
  (4) repeating steps (1) through (3) at least one additional time with a second portion of said polyvinyl halide resin and an inert gas heated to a second temperature,
  (5) plotting residual vinyl halide in the polyvinyl halide as a function of temperature from the values determined in steps (1) through (4), and,
  (6) selecting from the plot of step (5) the temperature corresponding to said preselected level of vinyl halide; and (b) purging the polyvinyl halide containing vinyl halide with an inert gas heated to a temperature of at least the determined threshold temperature until the vinyl halide content of the polyvinyl halide reaches said preselected level.

DETAILED DESCRIPTION

While our invention is suitable for reducing the vinyl halide content of the corresponding polyvinyl halide preferably it is concerned with reducing the vinyl chloride content of polyvinyl chloride. In view of this, the remainder of the discussion will be concerned with chloride as a halide.

There are several diffusion mechanisms by which vinyl chloride leaves the polyvinyl chloride resin. The fastest or primary mechanism is much more rapid than the other or non-primary mechanisms. Because of this the concentration of vinyl chloride (i.e., unreacted vinyl chloride) in the resin soon reaches a practical minimum threshold level. This minimum threshold level decreases little over a time span of several days so that for practical purposes this minimum threshold level is the practical level of vinyl chloride in the resin at the particular temperature. (Other terms may be used to describe this minimum threshold level such as quasi-equilibrium value. However, for the purpose of describing our invention, we prefer the term minimum threshold level.)

Stated alternatively, there is a minimum temperature level corresponding to a preselected level of vinyl chloride which varies with the type of resin used.

The first stage in practicing our invention is to determine the threshold temperature corresponding to said preselected level of vinyl chloride.

The threshold temperature is determined by the following steps:

(1) placing a portion of the polyvinyl chloride resin containing vinyl chloride in a reservoir through which an inert gas can be passed. (Knowing the salient features of our invention any person skilled in the art can readily determine the size of the reservoir and the amount of polyvinyl halide to be placed therein.)

(2) passing an inert gas heated to a designated (or first) temperature through the reservoir until the concentration of vinyl chloride in the effluent gas is less than 0.5 part per million by volume. Methods are well-known for determining the vinyl chloride content of inert gases. In view of this, it is not necessary to describe a method for this step. Any gas which is inert to polyvinyl chloride can be used in this step. Examples of suitable gases include air, nitrogen, carbon dioxide, natural gas, and methane. Of these, air and nitrogen are preferred. The rate at which the air is passed through the reservoir containing the polyvinyl chloride affects the vinyl chloride concentration versus time curve. In order for the vinyl chloride concentration to be less than 0.5 part per million by volume, the air rate to polyvinyl chloride amount should be less than 18.7 liters of air per kilogram of polyvinyl chloride per minute.

(3) determining the residual vinyl chloride content of the portion of polyvinyl chloride in the reservoir. The determination of the vinyl chloride content of polyvinyl chloride is published and is a well-known procedure. In view of this, it is not necessary to discuss in detail the procedure used. Even though different procedures are used for determining the vinyl chloride content of the polyvinyl chloride, this is immaterial in so long as the same procedure is used in conducting the process of our invention.

(4) steps (1) through (3) are repeated at least one additional time with a second portion of the polyvinyl chloride resin and preferably, the same inert gas heated to a second temperature. Preferably, steps (1) through (3) are repeated at least 3 times.

(5) a plot is then made of the residual vinyl chloride in the polyvinyl chloride as a function of temperatures from the values determined in steps (1) through (4).

(6) the next step is to select from the plot of step (5) the temperature corresponding to said preselected level of vinyl chloride.

Our process is particularly suitable for removing vinyl chloride from polyvinyl chloride prepared by the suspension polymerization process. As is well known, the product of this process typically is in particle form. While the size of the particles is not critical, in order to provide a more specific teaching, we would state that the maximum particle size is 2 cm. Typically, the maximum particle size is 1 cm. and usually the maximum particle size is 0.02 cm.

The second stage in our invention is purging the polyvinyl chloride, containing vinyl chloride with an inert gas, of the type described in the foregoing. The purging step is conducted in a vessel such as an aerated silo. The inert gas is heated to a temperature of at least the determined threshold temperature. The air is passed through the polyvinyl chloride until the vinyl chloride of the polyvinyl chloride reaches the preselected level. Recycled air may be combined with fresh air. The recycled air may be used until the equilibrium level is reached; that is, the point at which the vinyl chloride level of the polyvinyl chloride does not continue to decrease. At this point, the amount of recycled air is decreased until the desired value is obtained.

DESCRIPTION OF THE DRAWING

The accompanying drawing shows the results obtained on four different polyvinylchloride resins. The temperature is on the horizontal axis while the concentration of vinyl chloride is shown on the vertical axis. The temperatures are shown in both Fahrenheit and Centigrade figures since the original results were obtained using a Fahrenheit scale. Since the drawing is simple, further description of the drawing is considered unnecessary.

From the drawing, it can be seen that if it is desired to reduce the vinyl chloride content of Resin Type "A" to 10 parts per million by weight (ppmw), a temperature of 67° C. is required for the inert gas.

In order to disclose the nature of the present invention still more clearly, the following examples will be given. It is to be understood that the invention is not to be limited to the specific conditions or details set forth in these examples except insofar as such limitations are specified in the appended claims.

EXAMPLE 1

Using the procedure described in the foregoing, a sample of polyvinyl chloride (Type A) was placed in a reservoir. Heated air (24° C.) was passed through the resin until the concentration of vinyl chloride in the outlet air was less than 0.5 percent by weight. The vinyl chloride content of the resin was determined by a standard method. A second run was made using heated air at 39° C. Similar runs were made at 60° C., 67° C., and 82° C. The temperatures and vinyl chloride contents of the polyvinyl chloride are shown in Table I below.

The results are also shown as a plot in the accompanying FIGURE.

TABLE I

| Resin Type A | |
|---|---|
| Temp. ° C. | Conc. of Vinyl Chloride in PVC, ppmw |
| 24 | 43 |
| 39 | 24 |
| 60 | 13 |
| 67 | 10 |
| 82 | 8 |

EXAMPLE 2

The procedure of Example 1 was repeated on Resin Type B. The temperatures used and the vinyl chloride contents are shown in Table II below.

The results are also shown as a plot in the accompanying FIGURE.

TABLE II

| Resin Type B | |
|---|---|
| Temp. ° C | Conc. of Vinyl Chloride in PVC, ppmw |
| 22 | 16 |
| 53 | 10 |
| 74 | 3 |

EXAMPLES 3 and 4

The procedures of Example 1 were repeated on Resin Types C and D. The results are shown as a plot in the accompanying FIGURE.

EXAMPLE 5

This example illustrates the complete process of our invention using Resin Type A. Referring to Table I and the accompanying FIGURE, it is seen that in order to reduce the vinyl chloride content to 10 ppmw, it is necessary to use a temperature of at least 67° C.

An aerated silo having a volume of 5 liters and containing 1.6 kilograms of Type A polyvinyl chloride is blown with air heated to a temperature of 67° C., or slightly higher. The rate of blowing is 28.3 liters/minute. The resin is blown for 2 hours. At the end of this time, a sample of the resin contains 10 ppmw vinyl chloride.

Thus, having described the invention in detail, it will be understood by those skilled in the art that certain variations and modifications may be made without departing from the spirit and scope of the invention as defined herein and in the appended claims.

We claim:

1. A method of reducing the vinyl halide content of polyvinyl halide, in particle form, containing, vinyl halide, to a preselected level, wherein the method comprises:
    (a) determining the threshold temperature corresponding to said preselected level of vinyl halide, and
    (b) purging the polyvinyl halide containing vinyl halide, with an inert gas heated to a temperature of at least the determined threshold temperature until the vinyl halide content of the polyvinyl halide reaches said preselected level.

2. The method of claim 1 wherein the halide of the vinyl halide and polyvinyl halide is chloride.

3. A method of reducing the vinyl halide content of polyvinyl halide, in particle form, containing vinyl halide to a preselected level wherein said method comprises:
(a) determining the threshold temperature corresponding to said preselected level of vinyl halide by the steps of:
   (1) placing a first portion of said polyvinyl halide resin, containing vinyl halide, in a reservoir through which an inert gas can be passed,
   (2) passing an inert gas heated to a first temperature of known value through the reservoir until the concentration of vinyl halide in the effluent gas is less than 0.5 part per million by volume,
   (3) determining the residual vinyl halide concentration of said portion of polyvinyl halide resin,
   (4) repeating steps (1) through (3) at least one additional time with a second portion of said polyvinyl halide resin and an inert gas heated to a second temperature of known value,
   (5) plotting residual vinyl halide in the polyvinyl halide as a function of inert gas temperature from the values determined in steps (1) through (4), and,
   (6) selecting from the plot of step (5) the temperature corresponding to said preselected level of vinyl halide; and
(b) purging the polyvinyl halide containing vinyl halide with an inert gas heated to a temperature of at least the determined threshold temperature until the vinyl halide content of the polyvinyl halide reaches said preselected level.

4. The method of claim 3 wherein the halide of said vinyl halide and said polyvinyl halide is chloride.

5. The method of claim 4 wherein the inert gas is air.

6. The method of claim 4 wherein the inert gas is nitrogen.